Dec. 13, 1932.  W. E. HOPKINS  1,890,509

CARGO HOOK

Filed Jan. 17, 1931

INVENTOR.
William E. Hopkins
BY Joseph B. Gardner
ATTORNEY

Patented Dec. 13, 1932

1,890,509

UNITED STATES PATENT OFFICE

WILLIAM EDWARD HOPKINS, OF OAKLAND, CALIFORNIA

CARGO HOOK

Application filed January 17, 1931. Serial No. 509,364.

This invention relates to cargo hooks such as used by stevedores, longshoremen and freight handlers, to grip and handle heavy bales, boxes and other articles of cargo which are unwieldy and offer poor hand holds. In using such hooks should the boxes or objects being handled become overbalanced or unmanageable, it is frequently necessary for the user to let go of the hook to avoid being hit by the falling load. In such cases, should the load fall on the hook, and this is likely to happen, the handle, due to its angular disposition relative to the irregular shaped hook portion, is often damaged or broken, or the hook may break through and damage the boxes, et cetera, and possibly the contents thereof. Furthermore, cargo hooks as now constructed, when laid on the floor or other support will not lie flat thereon, but present an irregular formation with the pointed end often dangerously exposed to adjacent workmen. Should a heavy object fall on a hook thus laid down, the hook will in most instances be broken, bent or otherwise damaged. Again, the angular disposition of the handle relative to the hook proper is such that the hook cannot be packed or stored to lie flatwise and therefore is bulky and cannot be conveniently or safely carried in the pockets of the workmen or in tool kits or the like.

With the objections hereinbefore noted in mind, it is an object of the present invention to provide a hook which in a particularly efficient manner will eliminate said objections, and to this end the hook is constructed and arranged to collapse incident to boxes and heavy loads falling thereon and to being otherwise struck with heavy blows, but may be intentionally collapsed if desired preparatory to a flat packing or storing thereof or to carrying it in the pocket.

Another object is to provide a hook of the character described in which the safety collapsing characteristic thereof is made possible through the simple expedient of permitting the handle to turn on and relative to the shank of the hook, to a position lying in the same plane as the flat sides of the hook.

A further object is to provide in a hook of the character described an adjustable handle arranged to remain in any position into which it is adjusted, and especially to remain in the position assumed while using the hook.

Still another object is to provide a novel, simply constructed, strong and durable handle such as described, which although adjustable and arranged to turn as aforementioned, will not interfere with the ordinary and proper use of the hook or necessitate a change from the usual shapes and sizes as proven satisfactory in hooks such as now generally used.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
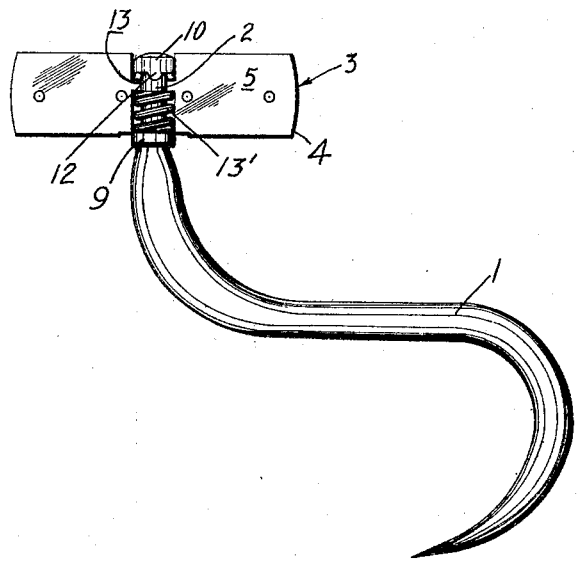
Figure 1 represents a side elevation of a cargo hook made in accordance with this invention, with one half of the handle removed in order to show the adjustable handle mounting, and with the remaining half of the handle in its adjusted or collapsed position.
Figure 2:
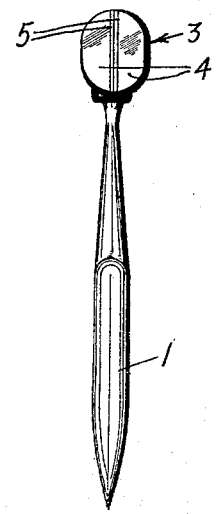
Figure 2 represents a view in elevation taken at right angles to Figure 1.
Figure 3:
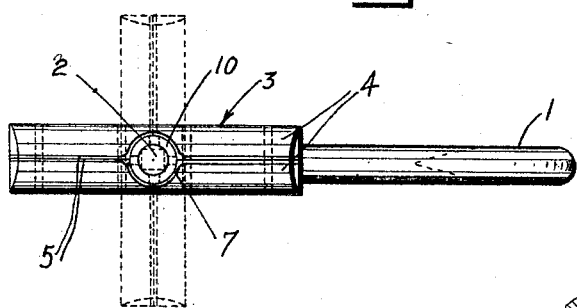
Figure 3 is a top plan of hook showing the handle in its usual position in dotted lines and in its safety position, in full lines.
Figure 5:
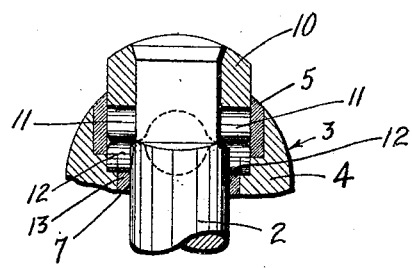
Figure 5 is a sectional view similar to Figure 4 showing the handle and mounting parts as when in adjusted or safety position.
Figure 4:
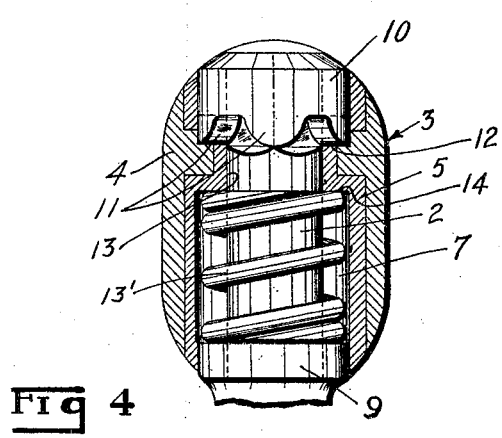
Figure 4 is an enlarged sectional view of the handle and its mounting means.

The present embodiment of the hook of this invention, as shown in detail in the accompanying drawing, comprises a hook portion 1 of the usual shape and formation found in cargo hooks as now generally used, said hook portion being flat in one place and substantially S shaped in another. On the short straight shank 2 of the hook the handle 3 of this invention is mounted in such manner that it will collapse when struck by a heavy load, and also may be intentionally turned on its mounting to position lying in the plane of flat sides of the hook as shown in Figures 1, 2 and 3 (full lines in the latter figure). It is seen that with the handle in such position the hook, as well as the handle, will be protected from being bent or broken should heavy objects fall thereon. Therefore the handle may be turned to that position when the hook is to be laid on the floor or the like, or is to be packed or stored or carried in the pockets. This disposition of the handle will also permit placing the hook on a floor or other support, with the pointed end down and flat against the support, in a safe position not likely to cause injury as might be the case were the pointed end projected upward.

Preferably the handle is rotatable in either direction from position of use shown in dotted lines in Figure 3 to the safe position shown in full lines in said figure. Furthermore, to insure the handle remaining in adjusted position, means is provided to automatically releasably and frictionally lock the handle in said positions, said means being designed to release the handle when the latter is forcefully and intentionally turned as well as when a heavy blow or force is accidentally applied thereto, as when a heavy object is dropped thereon. As here shown, these characteristics are provided with a sectional, two piece handle, the halves 4 of which are riveted or otherwise secured together around the shank 2. One of these halves is clearly shown in Figure 1 and each half is lined on its inner face with a metal plate 5. These plates and the halves 4 have complementary grooves therein forming a cylindrical barrel or bearing 7 when the halves are secured together and in which bearing the shank 2 is engaged. The shank 2 is reduced at its upper end and defines an annular shoulder 9 spaced inward from its outer extremity. Fixed on and against rotation or movement relative to the outer extremity is a cylindrical head or cap 10 engaging in the bearing 7. The lower or inner side of this head is formed with a series of rounded teeth or extensions 11 adapted to be moved into and out of notches or depressions 12 which latter are formed in inwardly extending semicircular flanges 13 provided on the plates 5 in the barrel or bearing 7. When the lugs or teeth 11 are engaged in the notches or depressions 12 the handle will be releasably held against turning relative to the shank.

In order to yieldingly hold the cap or head 10 in operative relation to the flanges 13, a stiff coiled spring is mounted on the shank 2 with one end engaged with the shoulder 9 and the other with a flange 14 similar to the one 13 on the plates 5. It will now be evident that to adjust the handle it must be forcibly turned to move the teeth 11 out of the notches 12 and when the handle is moved from a position, say as shown in dotted lines in Figure 3 to the position shown in full lines, the teeth 11 are again brought opposite the other pair of notches and the spring causes the teeth to be forcibly engaged in said notches, thereby locking the handle. It will be noted that the teeth 11 and notches 12 are provided at such points as to lock the handle in the two positions of the handle shown in Figure 3.

It is important to note that when the hook is in use, and the operator grips, pulls on the handle, the flanges 13 having the notches 12 thereon are pulled tighter against the teeth 11 on the head 10 and thereby the locking effect becomes more pronounced as the pull on the handle increases, whereby to positively prevent accidental turning of the handle during such use of the hook.

With reference to the foregoing description and accompanying drawing, it will now be seen that the hook of this invention will provide the objects and advantages aforementioned in a particularly efficient manner.

I claim:

1. In a cargo hook, a hook portion, a shank therefor, a handle rotatable on and extending transversely of the shank, and means for yieldingly and frictionally holding the handle against turning arranged to release the handle when the latter is forcibly turned and when a heavy object falls on the hook, said means comprising cooperating inclined surfaces provided on said shank and handle.

2. In a cargo hook, a hook portion, a shank therefor, a head on said shank, a shoulder on the shank inwardly of said head, a handle having a bore therethrough between its ends receiving said shank, an annular bearing surface on said handle in said bore and surrounding said shank, and having a plurality of curved notches therein, a plurality of curved teeth on said head arranged to engage on said surface and in said notches, and a spring arranged in said bore with its ends engaged with said handle and said shoulder in such manner as to urge the handle towards said head.

3. In a cargo hook, a hook portion, a shank therefor, a handle rotatable on and extending transversely of the shank, means for yieldingly and frictionally holding the handle against turning arranged to release the handle when the latter is forcibly turned and when a heavy object falls on the hook, said means comprising a head fixed to said shank and having inclined surfaces on its inner side, a bearing surface for said inclined surfaces formed on said handle and having cooperating inclined surfaces thereon for reception of said first named inclined surfaces, and a spring arranged in the handle to urge the two sets of inclined surfaces towards one another.

4. In a cargo hook, a hook portion, a shank therefor, a handle mounted on said shank and normally held fast thereto, and coacting inclined surfaces on said shank and handle arranged to allow for turning of said handle on said shank incident to a transverse twisting force applied between said handle and shank.

5. In a cargo hook, a shank having a hook portion thereon, a handle rotatably mounted on said shank, means operative to hold said handle in a predetermined operable position on said shank, and a second means cooperating with said first means to allow rotation of said handle from said position upon the application of merely a forced rotary movement between said handle and shank.

6. In a cargo hook, a shank having a hook portion thereon, a handle rotatably mounted on said shank, means operative to hold said handle in a predetermined operable position on said shank, and a spring cooperating with said means to allow rotation of said handle from said position upon the application of merely a forced rotary movement between said handle and shank.

7. In a cargo hook, a shank having a hook portion thereon, a handle mounted for rotation on said shank and rotatable thereon from an operative position to an inoperative position and vice versa, interengaging means on said shank and handle for holding said handle when in operative position against rotation, and a spring arranged to cooperate with said means to afford a longitudinal displacement and disengagement of said means upon the application of merely a forced rotary movement between said handle and shank.

8. In a cargo hook a hook portion, a shank therefor, a handle on said shank, cooperating surfaces on said handle and shank arranged to normally hold said handle against rotation relative to said shank, one of said surfaces being inclined to the other to thereby allow turning of said handle on the shank when the latter is forcibly turned and when a heavy object falls on the hook.

In testimony whereof, I have hereunto set my hand at Oakland, California, this 10th day of January, 1931.

WILLIAM EDWARD HOPKINS.